(12) United States Patent
Satish et al.

(10) Patent No.: US 8,037,526 B1
(45) Date of Patent: *Oct. 11, 2011

(54) DETECTING BUFFER OVERFLOWS USING FRAME POINTER CHARACTERISTICS

(75) Inventors: Sourabh Satish, Fremont, CA (US); Matthew Conover, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 1960 days.

This patent is subject to a terminal disclaimer.

(21) Appl. No.: 11/095,276

(22) Filed: Mar. 30, 2005

(51) Int. Cl. *G06F 12/14* (2006.01)

(52) U.S. Cl. .............. 726/22; 726/5; 726/23; 726/25; 711/6

(58) Field of Classification Search .............. 726/22–23, 726/17, 5, 25; 711/132, 170, 6; 717/130–131, 717/202, 217; 710/57; 712/202
See application file for complete search history.

(56) References Cited

U.S. PATENT DOCUMENTS

| | | | |
|---|---|---|---|
| 5,345,588 A | 9/1994 | Greenwood et al. | |
| 5,628,016 A | 5/1997 | Kukol | |
| 6,081,854 A | 6/2000 | Priem et al. | |
| 6,301,699 B1 | 10/2001 | Hollander et al. | |
| 6,578,094 B1 * | 6/2003 | Moudgill | 710/57 |
| 6,832,302 B1 | 12/2004 | Fetzer et al. | |
| 7,086,088 B2 * | 8/2006 | Narayanan | 726/22 |
| 7,178,132 B2 * | 2/2007 | Pierce | 717/127 |
| 2003/0172293 A1 * | 9/2003 | Johnson et al. | 713/200 |
| 2005/0102493 A1 | 5/2005 | DeWitt, Jr. et al. | |
| 2007/0180524 A1 * | 8/2007 | Choi et al. | 726/23 |

OTHER PUBLICATIONS

Satish et al., "Detecting Return-to-LIBC Buffer Overflows Via Dynamic Disassembly of Offsets", U.S. Appl. No. 11/064,712, filed Feb. 23, 2005.
Salinas et al., "Method to Identify Buffer Overflows and RLIBC Attacks", U.S. Appl. No. 11/176,855, filed Jul. 6, 2005.

* cited by examiner

*Primary Examiner* — Thanhnga Truong
(74) *Attorney, Agent, or Firm* — Gunnison, McKay & Hodgson, L.L.P.; Philip McKay

(57) ABSTRACT

A method makes use of positional relationships in a memory stack between the frame pointer, such as the Extended Base Pointer (EBP) in Windows®-based systems, of a critical call initiating function making a call to a critical operating system (OS) function, the top of stack position, such as the Process Environment Block (PEB) in Windows® based systems, and the bottom of stack position, such as the Extended Stack pointer (ESP) in a Windows® based system, to detect and block buffer overflows.

20 Claims, 9 Drawing Sheets

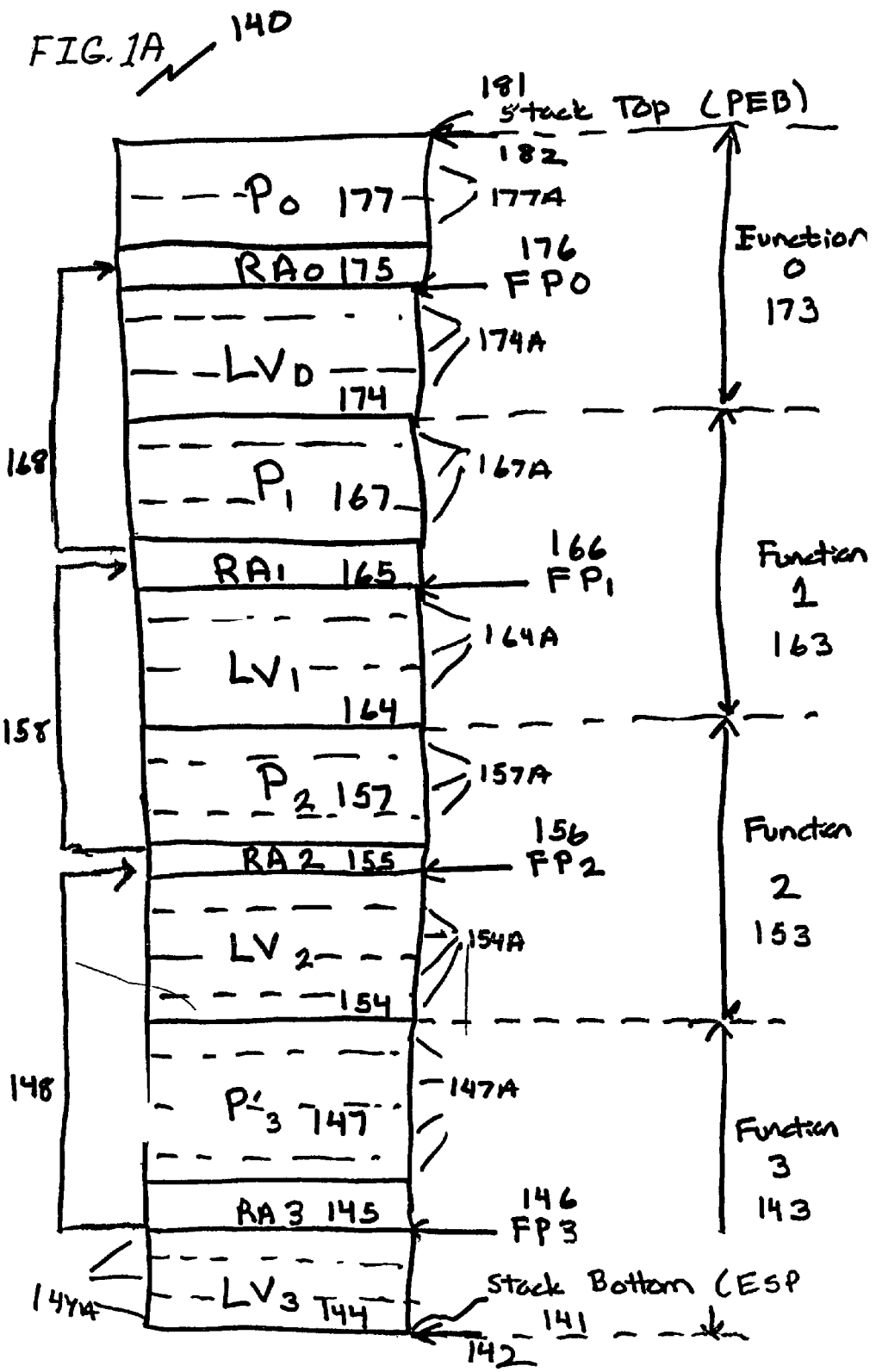

DETECTING BUFFER OVERFLOWS USING FRAME POINTER CHARACTERISTICS

BACKGROUND

1. Field

The present invention relates to the protection of computer systems. More particularly, the present invention relates to a system and method of detecting buffer overflows and Return-to-LIBC attacks.

2. Description of Related Art

Buffer overflow techniques have often been used by malicious hackers and virus writers to attack computer systems. Buffers are data storage areas that typically hold a predefined finite amount of data. A buffer overflow occurs when a program attempts to store more data into a buffer than the buffer can accommodate, i.e., the program attempts to store more than the predefined finite amount of data.

One category of buffer overflow, sometimes called stack-based buffer overflow, involves overwriting stack memory, sometimes called the stack. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly change the execution flow and instructions.

In the particular case of a Return-to-LIBC attack, hereinafter also referred to as a RLIBC attack, the attacker overflows the stack in such a way that a return address will be replaced to point to a library function in a loaded library inside the process address space. Thus, when the return address is used by the overflowed process, a library function will be executed. This way the attacker runs at least one call function, such as an Application Programming Interface (API), to make operating system function calls and run a command shell on the compromised system remotely.

SUMMARY OF THE INVENTION

A method according to one embodiment of the invention makes use of positional relationships between the frame pointer of the critical call initiating function making the call to the critical OS function, also referred to herein as simply a frame pointer, such as the Extended Base Pointer (EBP) in Windows®-based systems, the top of stack position, such as the Process Environment Block (PEB) in Windows® based systems, and the bottom of stack position, such as the Extended Stack pointer (ESP) in a Windows® based system.

In particular, in one embodiment of the invention, the of a critical call initiating function making a call to a critical operating system (OS) function is examined to determine if the frame pointer of the critical call initiating function has a logical positional relationship in the memory stack, also called simply the stack.

According to one embodiment of the present invention, a method includes stalling a call to a critical OS function and checking to ensure that the frame pointer of critical call initiating function making the call to the critical OS function has a logical relationship to the top of stack position, i.e., that the value pointed to by the frame pointer of the critical call initiating function represents a position in the stack below the top of the stack. If it is determined that the value pointed to by the frame pointer of the critical call initiating function represents a position in the stack above the top of the stack, the method further includes taking protective action to protect the computer system.

According to one embodiment of the present invention, a method includes stalling a call to a critical OS function and checking to ensure that the frame pointer of the critical call initiating function making the call to the critical OS function has a logical relationship to the bottom of stack position, i.e., that the value pointed to by the frame pointer of the critical call initiating function represents a position in the stack above the bottom of the stack. If it is determined that the value pointed to by the frame pointer of the critical call initiating function represents a position in the stack below the bottom of the stack, the method further includes taking protective action to protect the computer system.

According to one embodiment of the present invention, a method includes stalling a call to a critical OS function and checking to ensure that the frame pointer of the critical call initiating function making the call to the critical OS function has a logical relationship to the known function parameters in the stack, and is above a position in the stack of the function parameters block, i.e., that the value pointed to by the frame pointer of the critical call initiating function represents a position in the stack above the function parameters block, and not within, or below, the function parameters block. If it is determined that the value pointed to by the frame pointer of the critical call initiating function represents a position in the stack that is within, or below, the function parameters block, the method further includes taking protective action to protect the computer system.

According to one embodiment of the present invention, a method includes stalling a call to a critical OS function and checking the frame pointer of the critical call initiating function making the call to the critical OS function using all three tests described above and, if the frame pointer of the critical call initiating function fails any one of the three tests, the method further includes taking protective action to protect the computer system.

According to one embodiment of the present invention, a method includes repeating any, or all, of the three tests described above for each function section in the chain of function sections resulting in a call to the critical OS function until the entire relevant portion of the stack has been "walked".

Embodiments in accordance with the present invention are best understood by reference to the following detailed description when read in conjunction with the accompanying drawings.

BRIEF DESCRIPTION OF THE DRAWINGS

FIG. 1A is a representation of a stack memory including: a stack top position; a stack bottom position; and multiple function sections between the stack top position and the stack bottom position, each function section including a frame pointer, a function local variables block positioned below the frame pointer, and a function parameters block positioned above the frame pointer;

Common reference numerals are used throughout the drawings and detailed description to indicate like elements.

DETAILED DESCRIPTION

In the following discussion, call instructions are defined as instructions used to invoke a routine or function in a programming language. Calling a routine or function consists of specifying the routine or function name and, optionally, parameters. Calling a routine or function is referred to herein as the routine or function being "called" or "called by a call instruction". As an example, in a Windows® NT and Windows® 2000 environment the instruction "CALL" is a call instruction.

In addition, in the following discussion, a call function includes operating system function call instruction(s), i.e., the instruction, or set of instructions, that originates a call to an operating system function. Herein, the process whereby a call function originates a call to an operating system function is referred to as a "call to" an operating system function and the call function making a call to an operating system function is referred to as a "call initiating function". Call functions may be malicious or non-malicious. A parent application may include the call function, or, the parent application may itself be a call function. In addition, a function making a call to a critical OS function is referred to herein as a "critical call initiating function".

A method according to one embodiment of the invention makes use of positional relationships between: the frame pointer of a critical call initiating function making a call to the critical OS function, also referred to herein as simply a frame pointer (146, 156, 166 and 176 in FIG. 1A), such as the Extended Base Pointer (EBP) in Windows®-based systems; the top of the stack position (181 in FIG. 1A), such as the Process Environment Block (PEB) in Windows® based systems; and the bottom of the stack position (141 in FIG. 1A), such as the Extended Stack pointer (ESP) in a Windows® based system.

Figure 1:
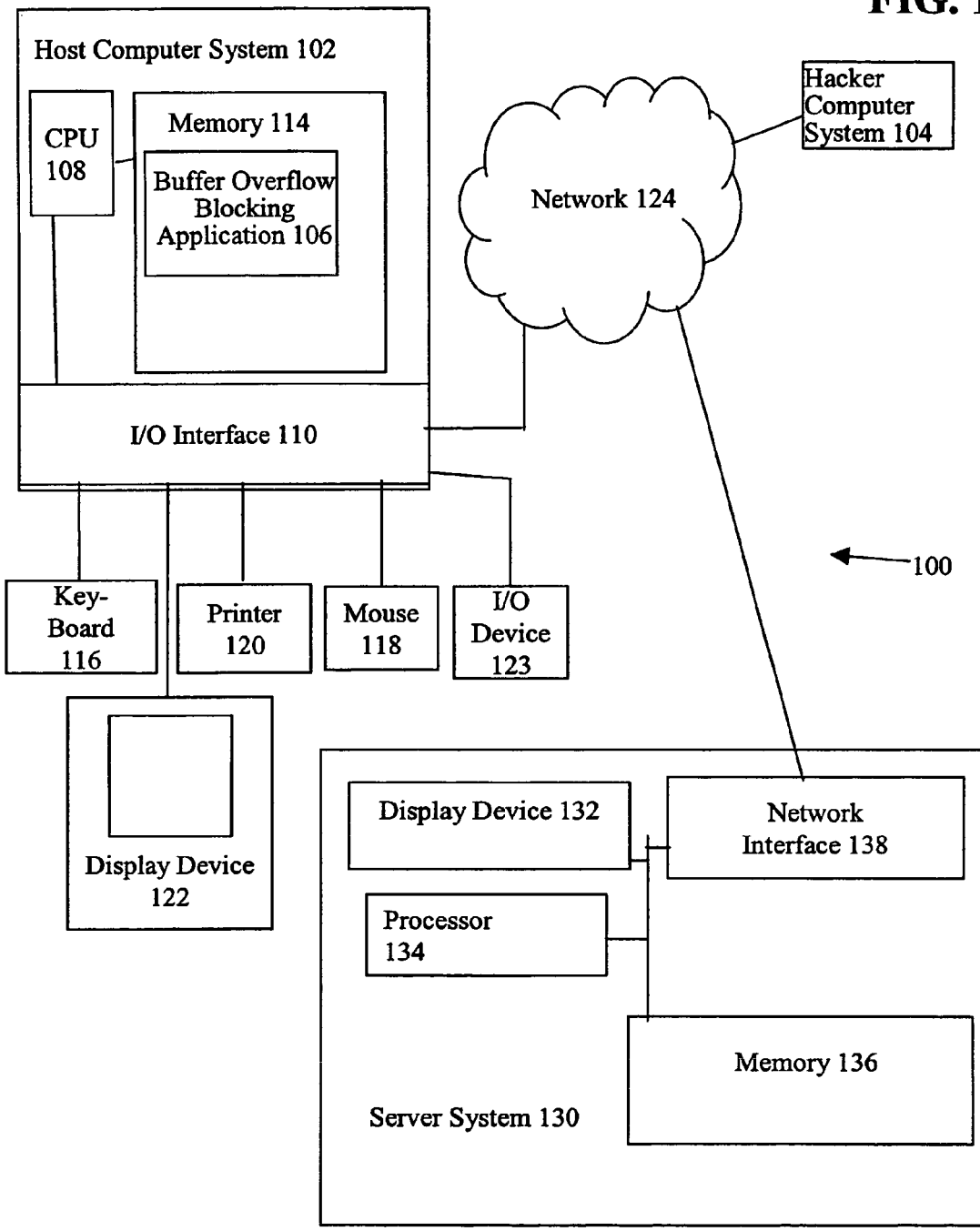
FIG. 1 is a diagram of a client-server system that includes a buffer overflow blocking application executing on a host computer system in accordance with one embodiment of the present invention.
Figure 2:
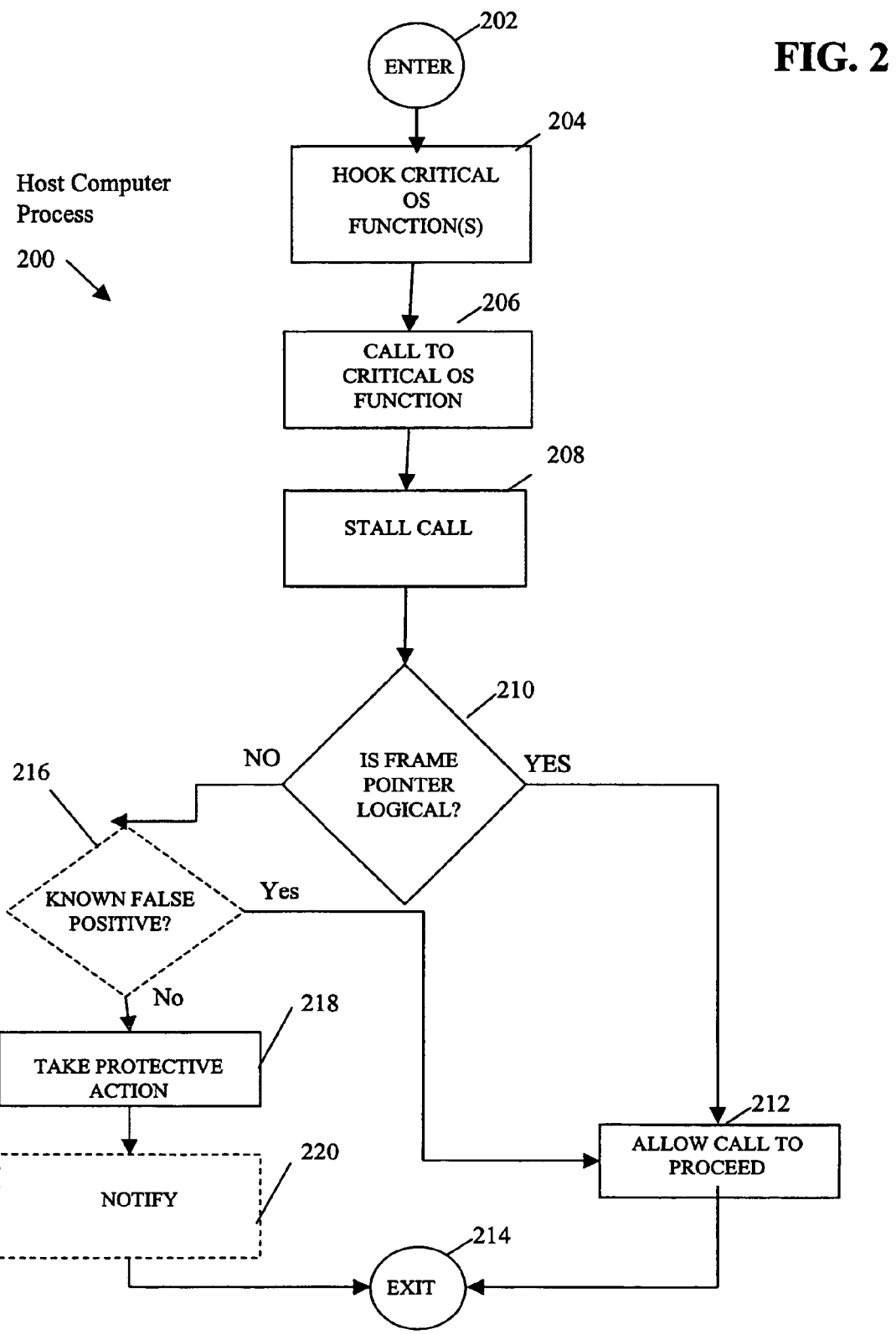
FIG. 2 is a flow diagram of a host computer process in accordance with one embodiment of the present invention.

Referring briefly to FIG. 2, according to the present invention, a method includes hooking critical OS functions (HOOK CRITICAL OS FUNCTION (S) OPERATION 204 in FIG. 2), stalling calls to critical OS functions (STALL CALL OPERATION 208 in FIG. 2) and checking to ensure that the positional relationships between the frame pointer (146, 156, 166, 176 in FIG. 1A) of the critical call initiating function (143, 153, 163, 173 in FIG. 1A) and the top of the stack position (181 in FIG. 1A) and/or the bottom of the stack position (141 in FIG. 1A) are logical, i.e., checking to ensure the value pointed to by the frame pointer of the critical call initiating function represents an address that is logical and within the boundaries of the memory stack (140 in FIG. 1A), also called stack 140.

Figure 4A:
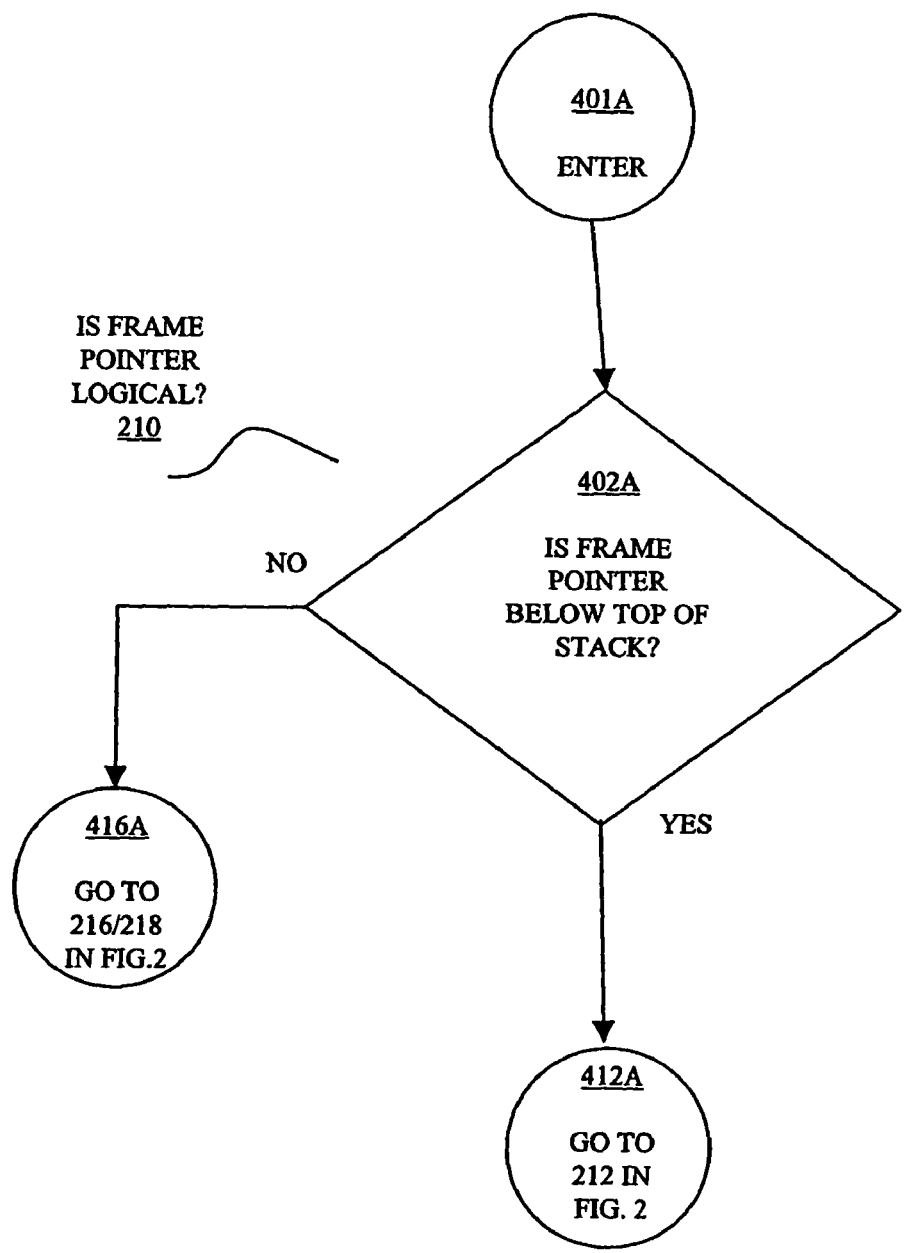
FIG. 4A is a flow diagram of one embodiment of IS FRAME POINTER LOGICAL? OPERATION of the host computer process of FIG. 2 in which the frame pointer of a critical call initiating function making a call to a critical OS function is examined to determine if the frame pointer has a logical relationship to the top of the stack position in accordance with one embodiment of the present invention.

Referring briefly to FIG. 4A, in one embodiment of the present invention, a method includes stalling a call to a critical OS function and checking to ensure that the frame pointer of critical call initiating function making the call to the critical OS function has a logical relationship to the top of stack position (IS FRAME POINTER BELOW TOP OF STACK? OPERATION 402A in FIG. 4A), i.e., that the value pointed to by the frame pointer of critical call initiating function making the call to the critical OS function represents a position below the top of stack position. If it is determined that the value pointed to by the frame pointer of the critical call initiating function represents an address above the top of the stack, the method further includes taking protective action to protect the computer system (GO TO 216/218 IN FIG. 2 OPERATION 416A).

Figure 4B:
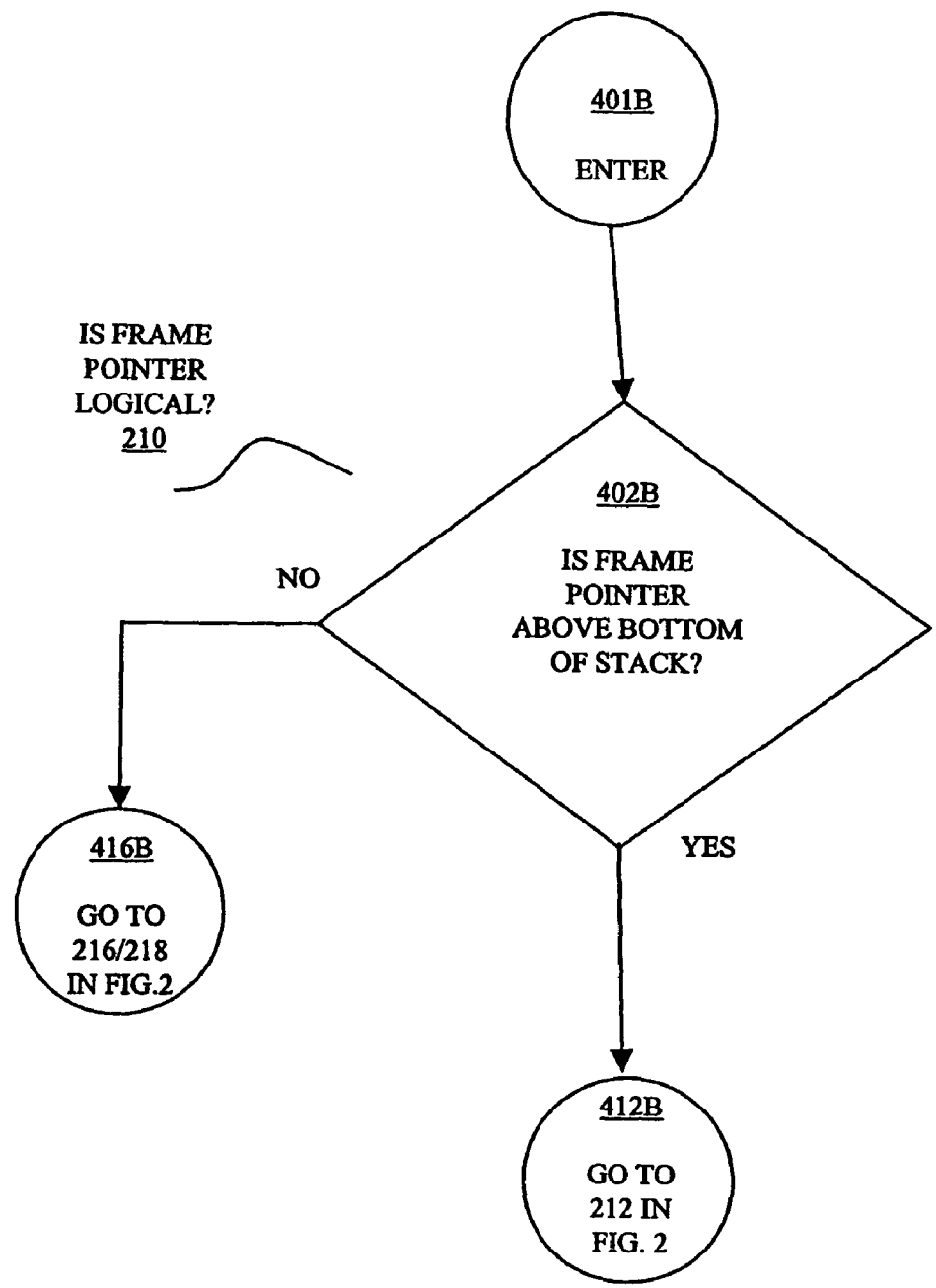
FIG. 4B is a flow diagram of one embodiment of IS FRAME POINTER LOGICAL? OPERATION of the host computer process of FIG. 2 in which the frame pointer of a critical call initiating function making a call to a critical OS function is examined to determine if the frame pointer has a logical relationship to the bottom of the stack position in accordance with one embodiment of the present invention.

Referring briefly to FIG. 4B, according to the present invention, a method includes stalling a call to a critical OS function and checking to ensure that the frame pointer of the critical call initiating function making the call to the critical OS function has a logical relationship to the bottom of stack position (IS FRAME POINTER ABOVE BOTTOM OF STACK? OPERATION 402B in FIG. 4B), i.e., that the value pointed to by the frame pointer of the critical call initiating function making the call to the critical OS function represents a position above the bottom of stack position. If it is determined that the value pointed to by the frame pointer of critical call initiating function making the call to the critical OS function represents an address below the bottom of the stack, the method further includes taking protective action to protect the computer system (GO TO 216/218 IN FIG. 2 OPERATION 416B).

Figure 4C:
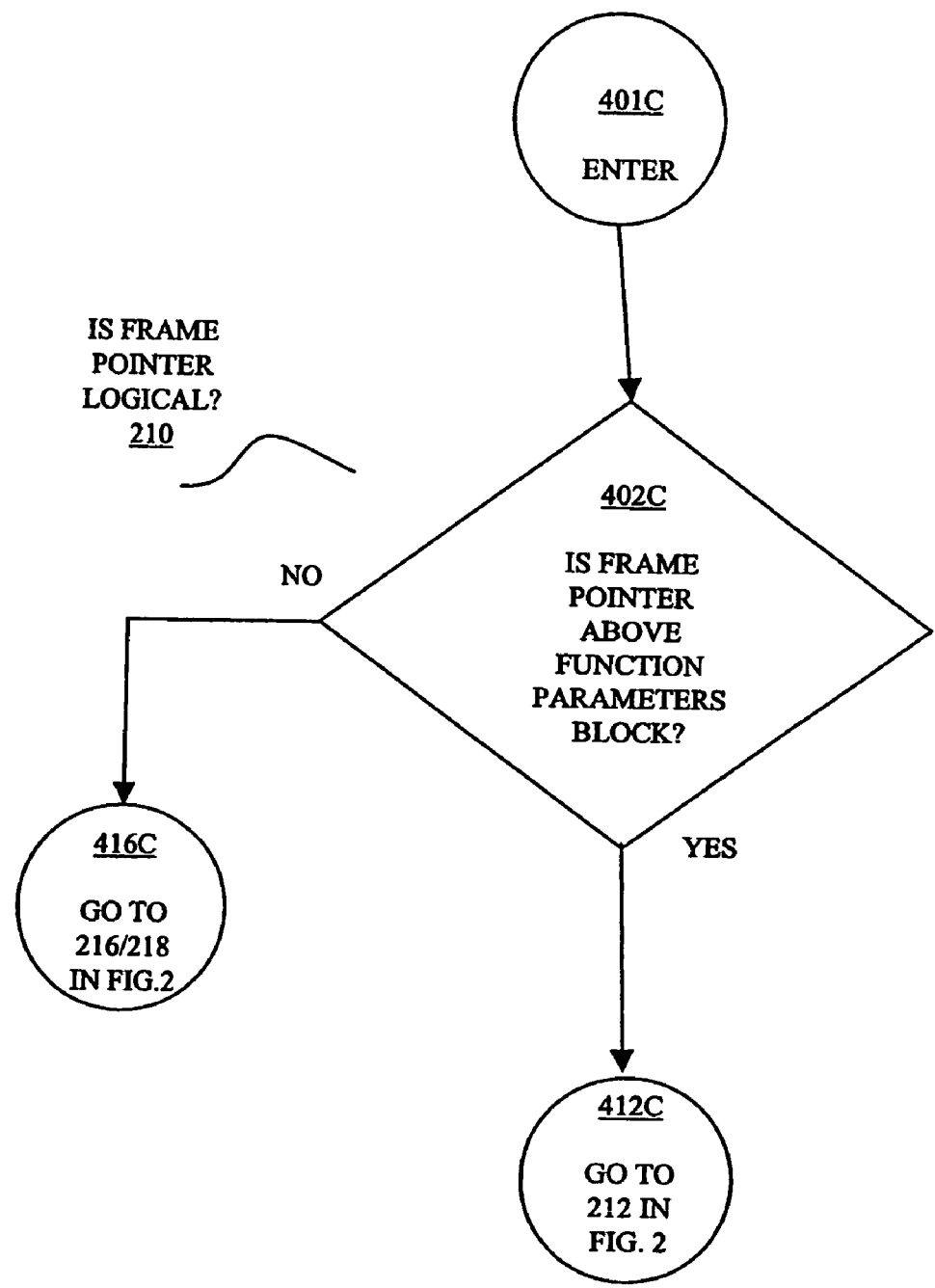
FIG. 4C is a flow diagram of one embodiment of IS FRAME POINTER LOGICAL? OPERATION of the host computer process of FIG. 2 in which the frame pointer of a critical call initiating function making a call to a critical OS function is examined to determine if the frame pointer has a logical relationship to the critical call initiating function parameters block in the stack in accordance with one embodiment of the present invention.

Referring briefly to FIG. 4C, according to one embodiment of the present invention, a method includes stalling a call to a critical OS function and checking to ensure that the frame pointer of the critical call initiating function making the call to the critical OS function has a logical relationship to the function parameters block in the stack (IS FRAME POINTER ABOVE FUNCTION PARAMETERS BLOCK? OPERA- TION 402C in FIG. 4C), i.e., that the value pointed to by the frame pointer of the critical call initiating function represents a position above the function parameters block and not within, or below, the function parameters block. If it is determined that the value pointed to by the frame pointer of the critical call initiating function represents a position that is within, or below, the function parameters block, the method further includes taking protective action to protect the computer system (GO TO 216/218 IN FIG. 2 OPERATION 416C).

Figure 4D:
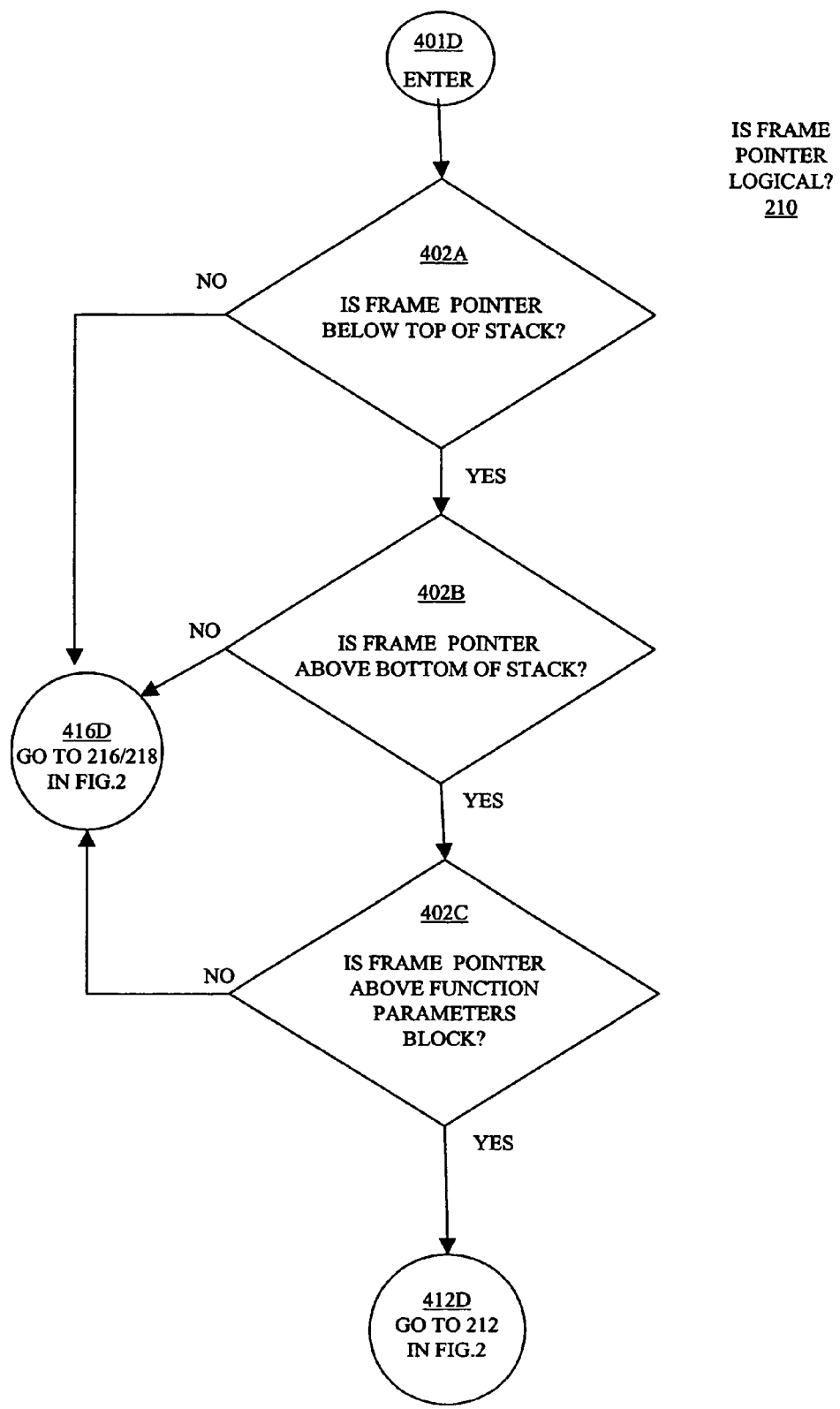
FIG. 4D is a flow diagram of one embodiment of IS FRAME POINTER LOGICAL? OPERATION of the host computer process of FIG. 2 in which the frame pointer of a critical call initiating function making a call to a critical OS function is examined to determine if: the frame pointer has a logical relationship to the top of the stack position; the frame pointer has a logical relationship to the bottom of the stack position; and if the frame pointer has a logical relationship to the critical call initiating function parameters block in the stack in accordance with one embodiment of the present invention.

Referring briefly to FIG. 4D, according to one embodiment of the present invention, a method includes stalling a call to a critical OS function and checking the frame pointer of the critical call initiating function making a call to a critical OS function using all three tests described above (IS FRAME POINTER BELOW TOP OF STACK? OPERATION 402A, IS FRAME POINTER ABOVE BOTTOM OF STACK? OPERATION 402B, and IS FRAME POINTER ABOVE FUNCTION PARAMETERS BLOCK? OPERATION 402C in FIG. 4D). According to this embodiment of the invention, if the frame pointer of the critical call initiating function fails any of the three tests, the method further includes taking protective action to protect the computer system (GO TO 216/218 IN FIG. 2 OPERATION 416D).

Figure 4E:
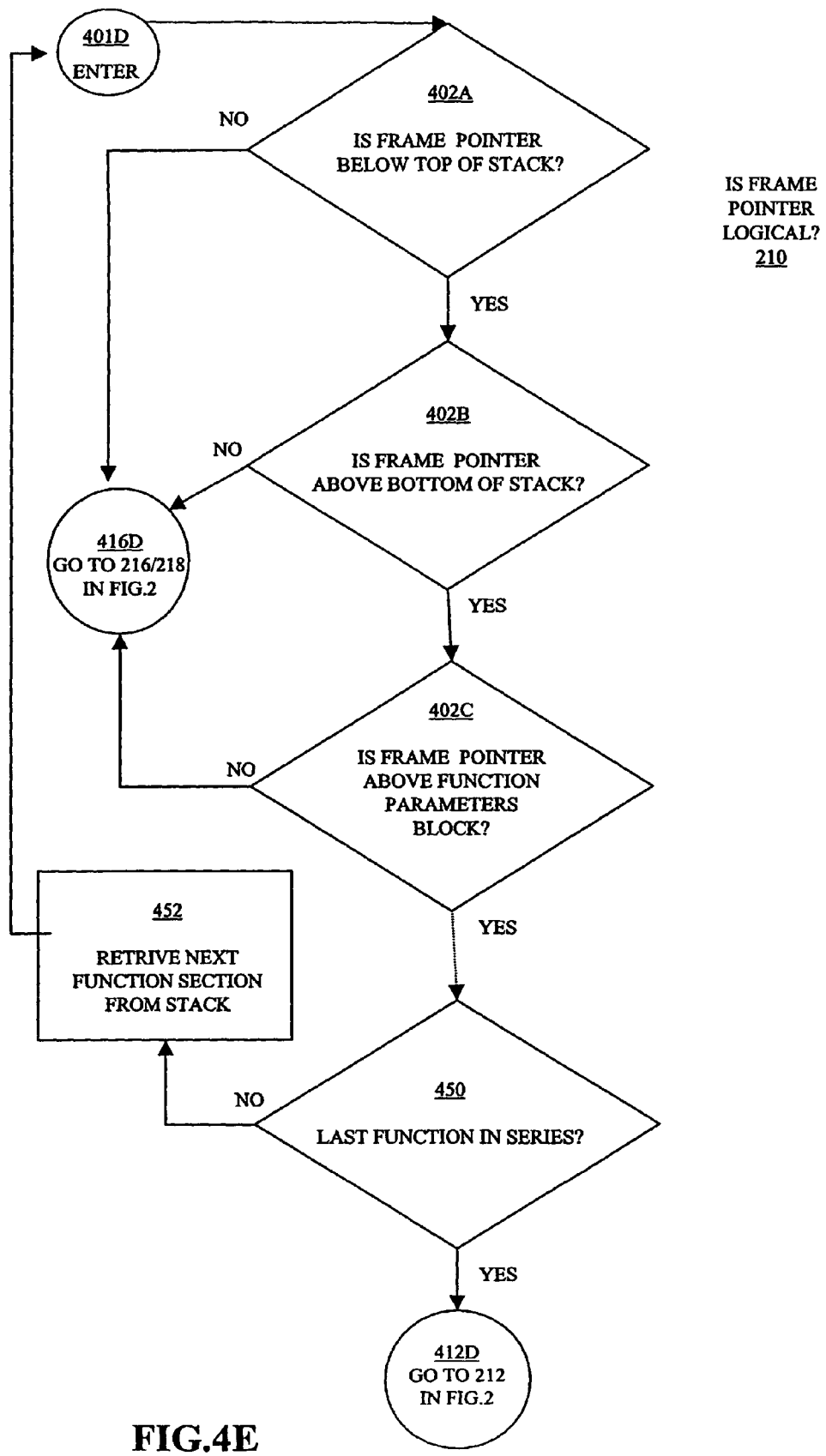
FIG. 4E is a flow diagram of one embodiment of IS FRAME POINTER LOGICAL? OPERATION of the host computer process of FIG. 2 in which the frame pointer of a critical call initiating function making a call to a critical OS function is examined to determine if: the frame pointer has a logical relationship to the top of the stack position; the frame pointer has a logical relationship to the bottom of the stack position; and if the frame pointer has a logical relationship to the critical call initiating function parameters block in the stack in accordance with one embodiment of the present invention and the process is repeated for each function in the chain of functions resulting in a call to a critical OS function until the entire relevant portion of the stack has been "walked".

Referring briefly to FIG. 4E, according to one embodiment of the present invention, a method includes stalling a call to a critical OS function and checking the frame pointer of the critical call initiating function making the call to a critical OS function using all three tests described above (IS FRAME POINTER BELOW TOP OF STACK? OPERATION 402A, IS FRAME POINTER ABOVE BOTTOM OF STACK? OPERATION 402B, and IS FRAME POINTER ABOVE FUNCTION PARAMETERS BLOCK? OPERATION 402C in FIG. 4E). According to this embodiment of the invention, if the frame pointer of the critical call initiating function fails any of the three tests, the method further includes taking protective action to protect the computer system (GO TO 216/218 IN FIG. 2 OPERATION 416E). In addition, according to this embodiment of the invention, if the frame pointer of the critical call initiating function passes all of the three tests, a determination is made as to whether the present function is the only function, or the last function, in a series of functions (LAST FUNCTION IN SERIES? OPERATION 450 IN FIG. 4E). If the critical call initiating function is not the last, or only, member of the series, the process is repeated for each function in the chain of functions resulting in a call to a critical OS function until the entire relevant portion of the stack has been "walked".

More particularly, FIG. 1 is a diagram of a client-server system 100 that includes a buffer overflow blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. In one embodiment, memory 114 includes a page based virtual memory system that uses pages, e.g., memory areas.

For example, Windows® NT and Windows® 2000 are 32-bit operating systems widely used on home and business computer systems. Windows® NT and Windows® 2000 provide page-based virtual memory management schemes that permit programs to realize a 4 GB (gigabyte) virtual memory address space. In one embodiment, when processor 108 is running in virtual memory mode, all addresses are assumed to be virtual addresses and are translated, or mapped, to physical addresses each time processor 108 executes a new instruction to access memory.

Conventionally, the 4 GB virtual memory address space is divided into two parts: a lower 2 GB user address space, also referred to as user mode address space, or ring 3, available for use by a program; and, a high 2 GB system address space, also referred to as kernel address space, or ring 0, reserved for use by the operating system.

To protect the integrity of the operating system code, and other kernel address space code and data structures from errant or malicious programs, and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, such as access to disk drives and network connections, user mode programs utilize system calls, sometimes called operating system (OS) function calls, which interface between the user mode and kernel mode functions.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, Buffer overflow blocking application 106 is loaded into host computer system 102 via I/O device 123, such as from a CD, DVD or floppy disk containing buffer overflow blocking application 106.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102 and, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principals of the invention.

Network 124 can be any network or network system that is of interest to a user. In various embodiments, network interface 138 and I/O interface 110 include analog modems, digital modems, or a network interface card.

In one embodiment of the invention, buffer overflow blocking application 106 is typically stored in memory 114 of host computer system 102 and executed on host computer system 102. The particular type, and configuration, of host computer system 102, hacker computer system 104, and server system 130 are not essential to the present invention.

FIG. 1A is a representation of a stack memory 140, also known as stack 140, that, in one embodiment of the invention resides in memory 114 or on CPU 108 in FIG. 1. As seen in FIG. 1A, stack 140 includes a stack bottom position 141, a stack top position 181, and multiple function sections 143, 153, 163 and 173 positioned between stack top position 181 and stack bottom position 141. Each function section 143, 153, 163 and 173 includes: a frame pointer 146, 156, 166 and 176, respectively; local variable blocks 144, 154, 164 and 174, respectively, positioned below respective frame pointers 146, 156, 166 and 176; and function parameters blocks 147, 157, 167 and 177, respectively, positioned above frame pointers 146, 156, 166 and 176, respectively.

As discussed above, stack 140 includes a stack bottom position 141 and a stack top position 181.

In one embodiment of the invention, a pointer 142 marks stack bottom position 141. In one embodiment of the invention, stack 140 is part of a Windows®-based system and pointer 142 is an Extended Stack pointer (ESP). In one embodiment of the invention, a pointer 182 marks stack top position 181. In one embodiment of the invention, stack 140 is part of a Windows®-based system and pointer 182 is a Process Environment Block (PEB).

As also shown in FIG. 1A, stack 140 includes a third function section 143. Third function section 143 includes a third frame pointer 146. In one embodiment of the invention, stack 140 is part of a Windows®-based system and third frame pointer 146 is an Extended Base Pointer (EBP). In one embodiment of the invention, the relative position of third frame pointer 146 within third function section 143 remains constant throughout the life of third function section 143. Third function section 143 also includes a local variables block 144 made up of one or more local variable positions 144A holding local variable values associated with the third function. In one embodiment of the invention, all positions 144A of local variables block 144 are below third frame pointer 146 and are therefore at positions in stack 140 of third frame pointer 146 minus a predetermined value. Third function section 143 also includes a function parameters block 147 made up of one or more parameters positions 147A holding parameter values associated with the third function. In one embodiment of the invention, all positions 147A of function parameters block 147 are above third frame pointer 146 and are therefore at positions in stack 140 of third frame pointer 146 plus a predetermined value. In addition, as shown in FIG. 1A, third frame pointer 146 points to third return address 145 which, in turn, holds a value linked with second frame pointer 156, second return address 155, and second function 153.

As also shown in FIG. 1A, stack 140 includes a second function section 153. Second function section 153 includes a second frame pointer 156. In one embodiment of the invention, stack 140 is part of a Windows®-based system and second frame pointer 156 is an Extended Base Pointer (EBP). In one embodiment of the invention, the relative position of second frame pointer 156 within second function section 153 remains constant throughout the life of second function section 153. Second function section 153 also includes a local variables block 154 made up of one or more local variable positions 154A holding local variable values associated with the second function. In one embodiment of the invention, all positions 154A of local variables block 154 are below second frame pointer 156 and are therefore at positions of second frame pointer 156 minus a predetermined value. Second function section 153 also includes a function parameters block 157 made up of one or more parameter positions 157A holding parameter values associated with the second function. In one embodiment of the invention, all positions 157A of function parameters block 157 are above second frame pointer 156 and are therefore at positions of second frame pointer 156 plus a predetermined value. In addition, as shown in FIG. 1A, second frame pointer 156 points to second return address 155 which, in turn, holds a value linked to first frame pointer 166, first return address 165, and first function 163.

As also shown in FIG. 1A, stack 140 includes a first function section 163. First function section 163 includes a first frame pointer 166. In one embodiment of the invention, stack 140 is part of a Windows®-based system and first frame pointer 166 is an Extended Base Pointer (EBP). In one embodiment of the invention, the relative position of First frame pointer 146 within first function section 163 remains constant throughout the life of first function section 163. First function section 163 also includes a local variables block 164 made up of one or more local variable positions 164A holding local variable values associated with the first function. In one embodiment of the invention, all positions 164A of local variables block 164 are below first frame pointer 166 and are therefore at positions of first frame pointer 166 minus a predetermined value. First function section 163 also includes a function parameters block 167 made up of one or more parameter positions 167A holding parameter values associated with the first function. In one embodiment of the invention, all positions 167A of function parameters block 167 are above first frame pointer 166 and are therefore at positions of first frame pointer 166 plus a predetermined value. In addition, as shown in FIG. 1A, first frame pointer 166 points to first return address 165 which, in turn, holds a value linked with zero frame pointer 176, zero return address 175, and zero function 173.

As also shown in FIG. 1A, stack 140 includes a zero function section 173. zero function section 173 includes a zero frame pointer 176. In one embodiment of the invention, stack 140 is part of a Windows®-based system and zero frame pointer 176 is an Extended Base Pointer (EBP). In one embodiment of the invention, the relative position of zero frame pointer 176 within zero function section 173 remains constant throughout the life of zero function section 173. Zero function section 173 also includes a local variables block 174 made up of one or more local variable positions 174A holding local variable values associated with the zero function. In one embodiment of the invention, all positions 174A of local variables block 174 are below zero frame pointer 176 and are therefore at positions of zero frame pointer 176 minus a predetermined value. Zero function section 173 also includes a function parameters block 177 made up of one or more parameter positions 177A holding parameter values associated with the zero function. In one embodiment of the invention, all positions 177A of function parameters block 177 are above zero frame pointer 176 and are therefore at positions of zero frame pointer 176 plus a predetermined value.

Those of skill in the art will recognize that the organizational relationships shown in FIG. 1A, and discussed above, can be varied from application to application, and operating system environment to operating system environment. In addition, the number of function sections 143, 153, 163, 173 of stack 140 can be more or less than the four function sections 143, 153, 163, 173 shown in FIG. 1A, and discussed above. Consequently the number of function sections and the organizational relationships of stack 140 shown in FIG. 1A, and discussed above, were chosen for illustrative purposes only and do not limit the invention in any way.

The structure and operation of: stack 140; function sections 143, 153, 163, 173; frame pointers 146, 156, 166, 176; local variable blocks 144, 154, 164, 174; return addresses 145, 155, 165, 175; and function parameters blocks 147, 157, 167, 177 is well know to those of skill in the art. Consequently a more detailed discussion of these elements and their operation is omitted here to avoid detracting from the invention.

As discussed in more detail below, the present invention makes use of positional relationships between a frame pointer of the critical call initiating function making the call to the critical OS function 146, 156, 166 or 176, also referred to herein as simply frame pointer 146, 156, 166 or 176, top of the stack position 181, bottom of stack position 141, and the position of function parameters blocks 147, 157, 167 and 177 to determine if a frame pointer 146, 156, 166 or 176 for a critical call initiating function 143, 153, 163 or 173 is logically positioned within stack 140.

For instance, each of frame pointers 146, 156, 166 and 176 points to a corresponding return address 145, 155 165, or 175. Each return address 145, 155 165, or 175 should hold a value for a position within stack 140 that is below top of stack position 181, otherwise the position addressed would be outside stack 140 and illogical. Consequently, as discussed in more detail below, in one embodiment of the invention, frame pointer 146, 156, 166 or 176 of a critical call initiating function 143, 153, 163 or 173 making a call to a critical operating system (OS) function is examined to determine if the frame pointer 146, 156, 166 or 176 has a logical relationship to top of the stack position 181, i.e., that the value pointed to by frame pointer 146, 156, 166 or 176 of the function 143, 153, 163 or 173 making the call to the critical OS function represents an position below top of stack position 181.

As discussed in more detail below, if it is determined that the value pointed to by frame pointer 146, 156, 166 or 176 of critical call initiating function 143, 153, 163 or 173 represents an address above top of stack position 181, the invention includes taking protective action to protect the computer system.

As another example, a given return address 145, 155, 165, or 175 should hold a value for a position within stack 140 that is above bottom of stack position 141, otherwise the position addressed would be outside stack 140 and illogical. Consequently, as discussed in more detail below, in one embodiment of the invention, frame pointer 146, 156, 166 or 176 of a critical call initiating function 143, 153, 163 or 173 is examined to determine if the frame pointer 146, 156, 166 or 176 has a logical relationship to bottom of stack position 141, i.e., that the value pointed to by frame pointer 146, 156, 166 or 176 of the function 143, 153, 163 or 173 represents a position above bottom of stack position 141.

As discussed in more detail below, if it is determined that the value pointed to by frame pointer 146, 156, 166 or 176 of a critical call initiating function 143, 153, 163 or 173 represents an address below bottom of stack position 141, the invention includes taking protective action to protect the computer system.

As another example, a given return address 145, 155, 165, or 175 should hold a value for a position within stack 140 that is above the function parameters block 147, 157, 167 and 177 associated with the critical call initiating function 143, 153, 163 or 173, otherwise the position addressed would be inside, or below, the associated function parameters block 147, 157, 167 or 177 and would be illogical. Consequently, as discussed in more detail below, in one embodiment of the invention, frame pointer 146, 156, 166 or 176 of a critical call initiating function 143, 153, 163 or 173 is examined to determine if frame pointer 146, 156, 166 or 176 has a logical relationship to the associated function parameters block 147, 157, 167 and 177, i.e., that the value pointed to by frame pointer 146, 156, 166 or 176 of the critical call initiating function 143, 153, 163 or 173 represents a position that is neither within, or below, the associated function parameters block 147, 157, 167 and 177.

As discussed in more detail below, if it is determined that the value pointed to by frame pointer 146, 156, 166 or 176 of a critical call initiating function 143, 153, 163 or 173 represents a position within or below the associated function parameters block 147, 157, 167 and 177, the invention includes taking protective action to protect the computer system.

A more detailed discussion of how the present invention makes use of positional relationships between frame pointers 146, 156, 166 and 176, top of the stack position 181, bottom of stack position 141, and the position of function parameters blocks 147, 157, 167 and 177 to determine if a frame pointer 146, 156, 166 or 176 for a critical call initiating function 143, 153, 163 or 173 is logically positioned within stack 140 is provided below.

FIG. 2 is a flow diagram of a host computer process 200 in accordance with one embodiment of the present invention. Referring now to FIGS. 1, 1A and 2 together, in one embodiment of the invention, execution of buffer overflow blocking application 106 by processor 108 results in the operations of host computer process 200 as described below.

From an ENTER OPERATION 202, flow moves to a HOOK CRITICAL OS FUNCTION(S) OPERATION 204. In one embodiment of the invention, ENTER OPERATION 202 takes place following previously conducted tests (not shown) that are used in conjunction with Host Computer Process 200 and are part of a chain of related tests. In HOOK CRITICAL OS FUNCTION(S) OPERATION 204, the critical operating system (OS) functions, e.g., at least one critical OS function, of host computer system 102 is/are hooked. In one embodiment, a system level, e.g., a kernel mode module or kernel mode driver, hooks the critical OS functions. Further, in one embodiment, a critical OS function is hooked by redirecting calls to the critical OS function to a hook module.

In one embodiment of the invention, an OS function is deemed critical if it is necessary for a first application, e.g., a parent application or critical call initiating function, to cause execution of a second application, e.g., a child application. In one particular embodiment, an OS function is deemed critical if it is necessary, or likely, to be used by a malicious parent application, e.g., an application which contains, or uses, malicious code, e.g., located on the stack, to execute a child application, where the child application allows remote access, e.g., remote system level access. Examples of child applications include the command prompt or "cmd.exe" on a Windows® operating system and "/bin/sh" on a UNIX or UNIX like, e.g., FreeBSD or MacOS x, operating system. As used herein, a child application is not dependent upon a parent application, i.e., once the child application is executed the parent application can be terminated without termination of the child application.

In one embodiment of the invention, typically run on a Windows® operating system, the CreateProcess ( ) and System ( ) are deemed critical OS functions. In yet another embodiment, critical OS functions are located in the C-library hence the name "Return-to-LIBC" attack.

As is well known to those of skill in the art, System calls expose all kernel functionality that user-mode programs require. User-mode programs need to utilize the functionality provided by the kernel, for example, to access disk drives, network connections, and shared memory. More particularly, because the processor prevents direct access to kernel mode functions by user-mode programs, user-mode programs use System calls, which form the only permitted interface between user-mode and kernel mode. In accordance with one embodiment of the invention, System calls include calls to critical OS functions and calls to non-critical OS function.

From HOOK CRITICAL OS FUNCTION(S) OPERATION 204, flow moves to a CALL TO CRITICAL OS FUNCTION OPERATION 206. In CALL TO CRITICAL OS FUNCTION OPERATION 206, a call to, sometimes called a call to critical OS function, or a critical OS function call, invoking a critical OS function is made by a call function of a parent application, also called a critical call initiating function. The parent application, and/or the critical call initiating function, may be malicious or non-malicious. More particularly, a call to a critical OS function is made by a critical call initiating function of a parent application to an OS function that was hooked in HOOK CRITICAL OS FUNCTION(S) OPERATION 204.

In accordance with one embodiment of the present invention, a call function includes the critical OS function call instruction(s), i.e., the instruction or set of instructions that originates the call to a critical OS function. Herein, the process whereby a call function originates a call to an operating system function is referred to as a "call to" an operating system function and the call function making a call to an operating system function, or a critical operating system function, is referred to as a critical call initiating function. The critical call initiating function may be malicious or non-malicious. The parent application may include the call function, or, in one embodiment, the parent application is the call function.

From CALL TO CRITICAL OS FUNCTION OPERATION 206, flow moves to a STALL CALL OPERATION 208. In STALL CALL OPERATION 208, the call to a critical OS function of CALL TO CRITICAL OS FUNCTION OPERATION 206 is stalled, i.e., is prevented from reaching the operating system. By stalling the call to the critical OS function, execution of the critical OS function is stalled.

From STALL CALL OPERATION 208, flow moves to an IS FRAME POINTER LOGICAL? OPERATION 210. In IS FRAME POINTER LOGICAL? OPERATION 210, a determination is made as to whether the frame pointer of the critical call initiating function making the call to the critical OS function, also referred to herein as the frame pointer e.g., the Extended Base Pointer (EBP) in Windows®-based systems, of the critical call initiating function making the call to a critical OS function has a logical positional relationship in the stack.

If a determination is made in IS FRAME POINTER LOGICAL? OPERATION 210 that the frame pointer of the critical call initiating function making the call to the critical OS function does have a logical relationship to the stack, flow moves an ALLOW CALL TO PROCEED OPERATION 212.

In ALLOW CALL TO PROCEED OPERATION 212, the call to the critical OS function is allowed to proceed. More particularly, the call to the critical OS function is passed to the operating system, or other tests (not shown) in a chain of related tests. As discussed above, the call to the critical OS function was stalled in STALL CALL OPERATION 208. From ALLOW CALL TO PROCEED OPERATION 212, flow moves to an EXIT OPERATION 214, or waits for the next call to a critical OS function and returns to CALL TO CRITICAL OS FUNCTION OPERATION 206.

In one embodiment of the invention, malicious code is defined as any computer program, module, set of modules, or code that enters a computer system without an authorized user's knowledge and/or without an authorized user's consent. A determination at IS FRAME POINTER LOGICAL? OPERATION 210 that the frame pointer of the critical call initiating function making the call to the critical OS function does have a logical positional relationship to the stack does not necessarily mean that the critical call initiating function is not malicious code. This is because of the possibility of "false positive" results. Consequently, a "YES" determination at IS FRAME POINTER LOGICAL? OPERATION 210, indicating that the frame pointer of the critical call initiating function making the call to the critical OS function does have a logical positional relationship to the stack is, according to one embodiment of the invention, considered an indeterminate result and, in one embodiment of the invention, flow would proceed to ALLOW CALL TO PROCEED OPERATION 212, then to EXIT OPERATION 214, and then on to another test, or tests, (not shown) to try and make a more conclusive determination about the call to the critical OS function.

On the other hand, if a determination is made at IS FRAME POINTER LOGICAL? OPERATION 210 that the frame pointer of the critical call initiating function making the call to a critical OS function does not have a logical positional relationship to the stack, i.e. the results at IS FRAME POINTER LOGICAL? OPERATION 210 are "NO", there is a good possibility that the critical call initiating function is the result of a buffer overflow, or is attempting to create a buffer overflow condition. Consequently, if the results at IS FRAME POINTER LOGICAL? OPERATION 210 are "NO", the critical call initiating function, and the critical OS function call itself, become suspect, the method of the invention further includes taking action to protect host computer system 102 in FIG. 1, and flow moves, in FIG. 2, optionally, to a KNOWN FALSE POSITIVE? OPERATION 216 (or directly to a TAKE PROTECTIVE ACTION OPERATION 218, if KNOWN FALSE POSITIVE? OPERATION 216 is not performed).

In KNOWN FALSE POSITIVE? OPERATION 216, a determination is made as to whether the call to a critical OS function is a known "false positive". A known "false positive" call to a critical OS function is a call to a critical OS function that triggers a "NO" result at IS FRAME POINTER LOGICAL? OPERATION 210, but is, in fact, safe, i.e., is not associated with malicious code. Illustratively, a user-defined or downloadable exclusion and/or inclusion list is used to determine whether the call to a critical OS function is a known "false positive".

If a determination is made in KNOWN FALSE POSITIVE? OPERATION 216 that the call to a critical OS function is a known "false positive" call to a critical OS function, flow moves to ALLOW CALL TO PROCEED OPERATION 212, which is performed as discussed above, and EXIT OPERATION 214. Conversely, if a determination is made at KNOWN FALSE POSITIVE? OPERATION 216 that the call to a critical OS function is not a known "false positive" call to a critical OS function, flow moves to a TAKE PROTECTIVE ACTION OPERATION 218.

In TAKE PROTECTIVE ACTION OPERATION 218, protective action is taken to prevent the malicious code of, or used by, the critical call initiating function from causing damage to, or exploiting, host computer system 102 in FIG. 1. For example, the call to a critical OS function is terminated. More particularly, the call to a critical OS function is not passed to the operating system but is terminated. As discussed above, the call to a critical OS function was stalled in STALL CALL OPERATION 208 in FIG. 2.

By terminating the call to a critical OS function, the malicious code of the critical call initiating function is prevented from exploiting and/or damaging host computer system 102 in FIG. 1. In one embodiment, by terminating the call to a critical OS function, the child application is prevented from being executed. By preventing execution of the child application, remote access is denied, thus preventing unauthorized access by malicious hackers as well as by replicating malware, e.g., worms.

As discussed above, if the results at IS FRAME POINTER LOGICAL? OPERATION 210 are "NO", the critical call initiating function, as well as the critical OS function call itself, become suspect. By terminating the call to a critical OS function, the critical OS function is prevented from being executed. As another example of protective action, the parent application, including the call function and/or a malicious thread running within the context of the parent application, is terminated. Termination of applications is well known to those of skill in the art and so is not discussed further for clarity of discussion.

Returning to FIG. 2, flow moves from TAKE PROTECTIVE ACTION OPERATION 218, optionally, to a NOTIFY OPERATION 220 (or directly to EXIT OPERATION 214, if NOTIFY OPERATION 220 is not performed). In NOTIFY OPERATION 220, the user of host computer system 102 in FIG. 1, and/or the administrator, are notified that protective action has been taken on host computer system 102, e.g., that a call, a parent application and/or a call function have been terminated. The user and/or administrator can be notified using any one of a number of techniques, e.g., by using a pop up window, by generating an e-mail, by writing to a file and/or otherwise by logging the event. Further, a notification can be provided to a security center.

From NOTIFY OPERATION 220 in FIG. 2, flow moves to EXIT OPERATION 214 or waits for the next call to a critical OS function and returns to CALL TO CRITICAL OS FUNCTION OPERATION 206.

Figure 3:
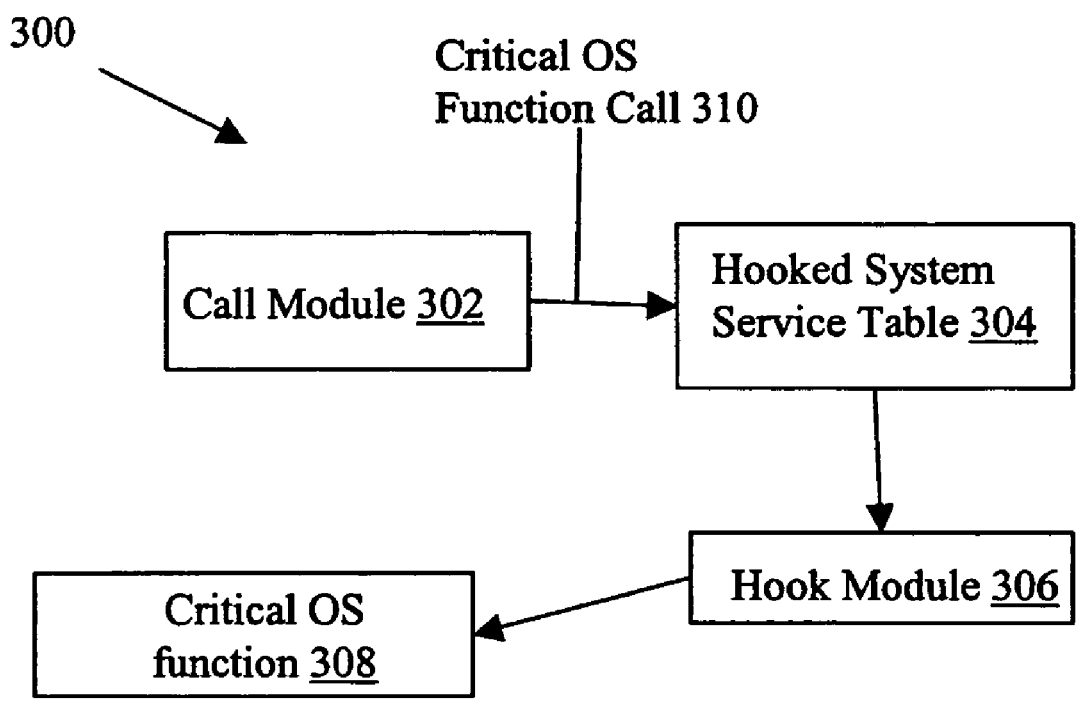
FIG. 3 is a diagram of a hooked operating system function call flow in accordance with one embodiment of the present invention.

FIG. 3 is a diagram of a hooked operating system function call flow 300 in accordance with one embodiment of the present invention. Referring now to FIGS. 2 and 3 together, a hook module 306 is used to hook calls to a critical OS function 308. In one embodiment, HOOK CRITICAL OS FUNCTION (S) OPERATION 204 is implemented using hook module 306, which is part of buffer overflow blocking application 106 (FIG. 1).

More particularly, in FIG. 3, a hooked system service table 304 routes calls to non-critical OS functions directly to the operating system (not shown). However, hooked system service table 304 routes calls to critical OS functions to hook module 306, e.g., a kernel mode module or kernel mode driver.

As is well known to those of skill in the art, a system service table, sometimes called a dispatch table or a system call table, relates system calls to specific addresses within the operating system kernel. Hooked system service table 304 in accordance with one embodiment of the present invention, redirects calls to critical OS functions to hook module 306 and from the specific addresses within the operating system kernel to which the calls to critical OS functions would otherwise be directed.

Although FIG. 3 describes one example of a hooked operating system function call path, in light of this disclosure, those of skill in the art will understand that other techniques can be used to hook operating system function(s). The particular technique used depends, for example, on the particular operating system.

In one embodiment, hook module 306 is used to stall a call to a critical OS function during STALL CALL OPERATION 208 of FIG. 2. Further, hook module 306 continues to stall calls to the critical OS function during IS FRAME POINTER LOGICAL? OPERATION 210, and KNOWN FALSE POSITIVE? OPERATION 216, if performed. Hook module 306 allows the calls to a critical OS function to proceed to the operating system and thus to critical OS function 308 during ALLOW CALL TO PROCEED OPERATION 212. Conversely, hook module 306 terminates the call to a critical OS function and/or takes other protective action during TAKE PROTECTIVE ACTION OPERATION 218.

In accordance with this embodiment of the invention, a call to a critical OS function 310 originates from a call function 302 during CALL TO CRITICAL OS FUNCTION OPERATION 206. Critical OS function call 310 is routed by hooked system service table 304 to hook module 306. Critical OS function call 310 is stalled by hook module 306 in STALL CALL OPERATION 208.

Hooking and hooking operations are well known to those of skill in the art. Consequently, a more detailed discussion of hooking and hooking operations is omitted here to avoid detracting from the present invention.

Returning to FIG. 2, as discussed above, if the results at IS FRAME POINTER LOGICAL? OPERATION 210 are "NO", the critical call initiating function becomes suspect. According to one embodiment of the invention, IS FRAME POINTER LOGICAL? OPERATION 210 of host computer process 200 of FIG. 2 determines whether the frame pointer of the critical call initiating function making the call to the critical OS has a logical relationship to the top of stack position.

Referring to FIG. 1A, FIG. 2, and FIG. 4A together, FIG. 4A is a flow diagram of one embodiment of IS FRAME POINTER LOGICAL? OPERATION 210 of the host computer process of FIG. 2 in which the frame pointer 146, 156, 166, or 176 of a critical call initiating function 143, 153, 163 or 173 making a call to a critical OS function is examined to determine if the frame pointer 146, 156, 166, or 176, such as the Extended Base Pointer (EBP) in Windows®-based systems, has a logical relationship to top of stack position 181 and pointer 182, such as the Process Environment Block (PEB) in Windows® based systems.

According to one embodiment of the present invention, a method includes stalling a call to a critical OS function at STALL CALL OPERTAION 208 IN FIG. 2, as described above. Flow then moves from STALL CALL OPERTAION 208 IN FIG. 2 to IS FRAME POINTER LOGICAL? OPERATION 210 and to ENTER OPERATION 401A in FIG. 401A. From ENTER OPERATION 401A flow moves to IS FRAME POINTER BELOW TOP OF STACK? OPERATION 402A. At IS FRAME POINTER BELOW TOP OF STACK? OPERATION 402A the frame pointer 146, 156, 166, or 176 of the critical call initiating function 143, 153, 163 or 173 making the call to the critical OS function is examined to determine if the frame pointer 146, 156, 166, or 176 of the critical call initiating function 143, 153, 163 or 173 has a logical positional relationship to top of stack position 181, i.e., a check is made to ensure that the return address value 145, 155, 165 or 175 pointed to by the frame pointer 146, 156, 166, or 176 of the critical call initiating function 143, 153, 163 or 173 represents a position in stack 140 below top of stack position 181.

If at IS FRAME POINTER BELOW TOP OF STACK? OPERATION 402A it is determined that the return address value 145, 155, 165 or 175 pointed to by the frame pointer 146, 156, 166, or 176 of the critical call initiating function 143, 153, 163 or 173 represents a position above top of stack position 181, i.e., a "NO" result is found at IS FRAME POINTER BELOW TOP OF STACK? OPERATION 402A, the method of the invention further includes taking action to protect the computer system as flow moves through GO TO 216/218 IN FIG. 2 OPERATION 416A to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER BELOW TOP OF STACK? OPERATION 402A it is determined that the return address value 145, 155, 165 or 175 pointed to by the frame pointer 146, 156, 166, or 176 of a critical call initiating function 143, 153, 163 or 173 represents a position below top of stack position 181, i.e., a "YES" result is found at IS FRAME POINTER BELOW TOP OF STACK? OPERATION 402A, the result is considered indeterminate, because of the possibility of "false positive" results, and flow moves through GO TO 212 IN FIG. 2 OPERATION 412A in FIG. 4A to ALLOW CALL TO PROCEED OPERATION 212 in FIG. 2.

Returning to FIG. 2, as discussed above, if the results at IS FRAME POINTER LOGICAL? OPERATION 210 are "NO", the critical call initiating function becomes suspect. According to one embodiment of the invention, IS FRAME POINTER LOGICAL? OPERATION 210 of host computer process 200 of FIG. 2 determines whether the frame pointer of the critical call initiating function making the call to the critical OS has a logical relationship to the bottom of stack position.

Referring to FIG. 1A, FIG. 2, and FIG. 4B together, FIG. 4B is a flow diagram of one embodiment of IS FRAME POINTER LOGICAL? OPERATION 210 of the host computer process of FIG. 2 in which the frame pointer 146, 156, 166, or 176 of a critical call initiating function 143, 153, 163 or 173 making a call to a critical OS function is examined to determine if the frame pointer 146, 156, 166, or 176, such as the Extended Base Pointer (EBP) in Windows®-based systems, has a logical positional relationship to bottom of stack position 141 and pointer 142, such as the Extended Stack Pointer (ESP) in Windows® based systems.

According to one embodiment of the present invention, a method includes stalling a call to a critical OS function at STALL CALL OPERTAION 208 IN FIG. 2, as described above. Flow then moves from STALL CALL OPERTAION 208 IN FIG. 2 to IS FRAME POINTER LOGICAL? OPERATION 210 and ENTER OPERATION 401B in FIG. 401B. From ENTER OPERATION 401B flow moves to IS FRAME POINTER ABOVE BOTTOM OF STACK? OPERATION 402B. At IS FRAME POINTER ABOVE BOTTOM OF STACK? OPERATION 402B the frame pointer 146, 156, 166, or 176 of the critical call initiating function 143, 153, 163 or 173 making the call to the critical OS function is examined to determine if the frame pointer 146, 156, 166, or 176 of a critical call initiating function 143, 153, 163 or 173 has a logical positional relationship to bottom of stack position 141 and pointer 142, i.e., a check is made to ensure that the return address value 145, 155, 165 or 175 pointed to by the frame pointer 146, 156, 166, or 176 of a critical call initiating function 143, 153, 163 or 173 represents a position in stack 140 above bottom of stack position 141.

If at IS FRAME POINTER ABOVE BOTTOM OF STACK? OPERATION 402B it is determined that the return address value 145, 155, 165 or 175 pointed to by the frame pointer 146, 156, 166, or 176 of a critical call initiating function 143, 153, 163 or 173 represents a position below bottom of stack position 141, i.e., a "NO" result is found at IS FRAME POINTER ABOVE BOTTOM OF STACK? OPERATION 402B, the method of the invention further includes taking action to protect the computer system as flow moves through GO TO 216/218 IN FIG. 2 OPERATION 416B to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER ABOVE BOTTOM OF STACK? OPERATION 402B it is determined that the return address value 145, 155, 165 or 175 pointed to by the frame pointer 146, 156, 166, or 176 of a critical call initiating function 143, 153, 163 or 173 represents a position above bottom of stack position 141, i.e., a "YES" result is found at IS FRAME POINTER ABOVE BOTTOM OF STACK? OPERATION 402B, the result is considered indeterminate, because of the possibility of "false positive" results, and flow moves through GO TO 212 IN FIG. 2 OPERATION 412B in FIG. 4A to ALLOW CALL TO PROCEED OPERATION 212 in FIG. 2.

Returning to FIG. 2, as discussed above, if the results at IS FRAME POINTER LOGICAL? OPERATION 210 are "NO", the critical call initiating function becomes suspect. According to one embodiment of the invention, IS FRAME POINTER LOGICAL? OPERATION 210 of host computer process 200 of FIG. 2 determines whether the frame pointer of a critical call initiating function has a logical positional relationship to the function parameters block of the critical call initiating function.

Referring to FIG. 1A, FIG. 2 and FIG. 4C together, FIG. 4C is a flow diagram of one embodiment of IS FRAME POINTER LOGICAL? OPERATION 210 of the host computer process of FIG. 2 in which the frame pointer 146, 156, 166, or 176 of a critical call initiating function 143, 153, 163 or 173 making a call to a critical OS function is examined to determine if the frame pointer 146, 156, 166, or 176, such as the Extended Base Pointer (EBP) in Windows®-based systems, has a logical relationship to the function parameters block 147, 157, 167 or 177 of the critical call initiating function 143, 153, 163 or 173.

According to one embodiment of the present invention, a method includes stalling a call to a critical OS function at STALL CALL OPERTAION 208 IN FIG. 2, as described above. Flow then moves from STALL CALL OPERTAION 208 IN FIG. 2 to IS FRAME POINTER LOGICAL? OPERATION 210 and ENTER OPERATION 401C in FIG. 401C. From ENTER OPERATION 401C flow moves to IS FRAME POINTER ABOVE FUNCTION PARAMETERS BLOCK? OPERATION 402C. At IS FRAME POINTER ABOVE FUNCTION PARAMETERS BLOCK? OPERATION 402C the frame pointer 146, 156, 166, or 176 of a critical call initiating function 143, 153, 163 or 173 making the call to the critical OS function is examined to determine if the frame pointer 146, 156, 166, or 176 of a critical call initiating function 143, 153, 163 or 173 making the call to the critical OS function has a logical relationship to the function parameters block 147, 157, 167 or 177 associated with the critical call initiating function 143, 153, 163 or 173, i.e., a check is made to ensure that the return address value 145, 155, 165 or 175 pointed to by the frame pointer 146, 156, 166, or 176 of the associated critical call initiating function 143, 153, 163 or 173 represents a position above the function parameters block 147, 157, 167 or 177 associated with the critical call initiating function.

If at IS FRAME POINTER ABOVE FUNCTION PARAMETERS BLOCK? OPERATION 402C it is determined that the return address value 145, 155, 165 or 175 pointed to by the frame pointer 146, 156, 166, or 176 of a critical call initiating function 143, 153, 163 or 173 represents a position within, or below, the function parameters block 147, 157, 167, or 177 associated with the critical call initiating function 143, 153, 163 or 173, i.e., a "NO" result is found at IS FRAME POINTER ABOVE FUNCTION PARAMETERS BLOCK? OPERATION 402C, the method of the invention further includes taking action to protect the computer system as flow moves through GO TO 216/218 IN FIG. 2 OPERATION 416B to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER ABOVE FUNCTION PARAMETERS BLOCK? OPERATION 402C it is determined that the return address value 145, 155, 165 or 175 pointed to by the frame pointer 146, 156, 166, or 176 of a critical call initiating function 143, 153, 163 or 173 represents a position above the function parameters block 147, 157, 167, or 177 associated with the critical call initiating function 143, 153, 163 or 173, i.e., a "YES" result is found at IS FRAME POINTER ABOVE FUNCTION PARAMETERS BLOCK? OPERATION 402C, the result is considered indeterminate, because of the possibility of "false positive" results, and flow moves through GO TO 212 IN FIG. 2 OPERATION 412B in FIG. 4A to ALLOW CALL TO PROCEED OPERATION 212 in FIG. 2.

Returning to FIG. 2, as discussed above, if the results at IS FRAME POINTER LOGICAL? OPERATION 210 are "NO", the critical call initiating function becomes suspect. According to one embodiment of the invention, IS FRAME POINTER LOGICAL? OPERATION 210 of host computer process 200 of FIG. 2 uses all three tests 402A, 402B and 402C discussed above to determine whether the frame pointer of the critical call initiating function has a logical positional relationship to the stack.

Referring to FIG. 1A, FIG. 2 and FIG. 4D together, FIG. 4D is a flow diagram of one embodiment of IS FRAME POINTER LOGICAL? OPERATION 210 of the host computer process of FIG. 2. As seen in FIG. 4D, according to one embodiment of the present invention, a method includes stalling a call to a critical OS function at STALL CALL OPERTAION 208 IN FIG. 2, as described above. Flow then moves from STALL CALL OPERTAION 208 IN FIG. 2 to IS FRAME POINTER LOGICAL? OPERATION 210 and to ENTER OPERATION 401D in FIG. 401D. From ENTER OPERATION 401D flow moves to IS FRAME POINTER BELOW TOP OF STACK? OPERATION 402A. At IS FRAME POINTER BELOW TOP OF STACK? OPERATION 402A the frame pointer 146, 156, 166, or 176 of a critical call initiating function 143, 153, 163 or 173 making the call to the critical OS function is examined to determine if the frame pointer 146, 156, 166, or 176 of a critical call initiating function 143, 153, 163 or 173 making the call to the critical OS function has a logical positional relationship to top of stack position 181, i.e., a check is made to ensure that the return address value 145, 155, 165 or 175 pointed to by the frame pointer 146, 156, 166, or 176 of a critical call initiating function 143, 153, 163 or 173 represents a position below top of stack position 181.

If at IS FRAME POINTER BELOW TOP OF STACK? OPERATION 402A it is determined that the return address value 145, 155, 165 or 175 pointed to by the frame pointer 146, 156, 166, or 176 of a critical call initiating function 143, 153, 163 or 173 represents a position above top of stack position 181, i.e., a "NO" result is found at IS FRAME POINTER BELOW TOP OF STACK? OPERATION 402A, the method of the invention further includes taking action to protect the computer system as flow moves through GO TO 216/218 IN FIG. 2 OPERATION 416D to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER BELOW TOP OF STACK? OPERATION 402A it is determined that the return address value 145, 155, 165 or 175 pointed to by the frame pointer 146, 156, 166, or 176 of a critical call initiating function 143, 153, 163 or 173 represents a position below top of stack position 181, i.e., a "YES" result is found at IS FRAME POINTER BELOW TOP OF STACK? OPERATION 402A, the result is considered indeterminate, because of the possibility of "false positive" results, and flow moves to IS FRAME POINTER ABOVE BOTTOM OF STACK? OPERATION 402B.

At IS FRAME POINTER BELOW BOTTOM OF STACK? OPERATION 402B the frame pointer 146, 156, 166, or 176 of the critical call initiating function 143, 153, 163 or 173 making the call to the critical OS function is examined to determine if the frame pointer 146, 156, 166, or 176 of the critical call initiating function 143, 153, 163 or 173 has a logical relationship to bottom of stack position 141 and pointer 142, i.e., a check is made to ensure that the return address value 145, 155, 165 or 175 pointed to by the frame pointer 146, 156, 166, or 176 of a critical call initiating function 143, 153, 163 or 173 represents a position above bottom of stack position 141.

If at IS FRAME POINTER ABOVE BOTTOM OF STACK? OPERATION 402B it is determined that the return address value 145, 155, 165 or 175 pointed to by the frame pointer 146, 156, 166, or 176 of a critical call initiating function 143, 153, 163 or 173 represents a position below bottom of stack position 141, i.e., a "NO" result is found at IS FRAME POINTER ABOVE BOTTOM OF STACK? OPERATION 402B, the method of the invention further includes taking action to protect the computer system as flow moves through GO TO 216/218 IN FIG. 2 OPERATION 416B to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER ABOVE BOTTOM OF STACK? OPERATION 402B it is determined that the return address value 145, 155, 165 or 175 pointed to by the frame pointer 146, 156, 166, or 176 of a critical call initiating function 143, 153, 163 or 173 represents a position above bottom of stack position 141, i.e., a "YES" result is found at IS FRAME POINTER ABOVE BOTTOM OF STACK? OPERATION 402B, the result is considered indeterminate, because of the possibility of "false positive" results, and flow moves to IS FRAME POINTER ABOVE FUNCTION PARAMETERS BLOCK? OPERATION 402C.

At IS FRAME POINTER ABOVE FUNCTION PARAMETERS BLOCK? OPERATION 402C the frame pointer 146, 156, 166, or 176 of the critical call initiating function 143, 153, 163 or 173 making the call to the critical OS function is examined to determine if the frame pointer 146, 156, 166, or 176 of a critical call initiating function 143, 153, 163 or 173 making the call to the critical OS function has a logical relationship the function parameters block 147, 157, 167 or 177 associated with the critical call initiating function 143, 153, 163 or 173, i.e., a check is made to ensure that the return address value 145, 155, 165 or 175 pointed to by the frame pointer 146, 156, 166, or 176 of the associated critical call initiating function 143, 153, 163 or 173 represents a position above the function parameters block 147, 157, 167, or 177 associated with the critical call initiating function 143, 153, 163 or 173.

If at IS FRAME POINTER ABOVE FUNCTION PARAMETERS BLOCK? OPERATION 402C it is determined that the return address value 145, 155, 165 or 175 pointed to by the frame pointer 146, 156, 166, or 176 of the critical call initiating function 143, 153, 163 or 173 represents a position within, or below, the function parameters block 147, 157, 167, or 177 associated with the critical call initiating function 143, 153, 163 or 173, i.e., a "NO" result is found at IS FRAME POINTER ABOVE FUNCTION PARAMETERS BLOCK? OPERATION 402C, the method of the invention further includes taking action to protect the computer system as flow moves through GO TO 216/218 IN FIG. 2 OPERATION 416B to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER ABOVE FUNCTION PARAMETERS BLOCK? OPERATION 402C it is determined that the return address value 145, 155, 165 or 175 pointed to by the frame pointer 146, 156, 166, or 176 of the critical call initiating function 143, 153, 163 or 173 represents a position above the function parameters block 147, 157, 167, or 177 associated with the critical call initiating function 143, 153, 163 or 173, i.e., a "YES" result is found at IS FRAME POINTER ABOVE FUNCTION PARAMETERS BLOCK? OPERATION 402C, the result is considered indeterminate, because of the possibility of "false positive" results, and flow moves through GO TO 212 IN FIG. 2 OPERATION 412B in FIG. 4A to ALLOW CALL TO PROCEED OPERATION 212 in FIG. 2.

Returning to FIG. 2, as discussed above, if the results at IS FRAME POINTER LOGICAL? OPERATION 210 are "NO", the critical call initiating function becomes suspect. According to one embodiment of the invention, IS FRAME POINTER LOGICAL? OPERATION 210 of host computer process 200 of FIG. 2 uses all three tests 402A, 402B, 402C discussed above to determine whether the frame pointer of the critical call initiating function has a logical relationship to the stack. Then the process is repeated for each function in the chain of functions resulting in the call to a critical OS function until the entire relevant portion of the stack has been "walked".

Referring to FIG. 1A, FIG. 2, and FIG. 4E together, FIG. 4E is a flow diagram of one embodiment of IS FRAME POINTER LOGICAL? OPERATION 210 of the host computer process of FIG. 2. As seen in FIG. 4E, according to one embodiment of the present invention, a method includes stalling a call to a critical OS function at STALL CALL OPERTAION 208 IN FIG. 2, as described above. Flow then moves from STALL CALL OPERTAION 208 IN FIG. 2 to IS FRAME POINTER LOGICAL? OPERATION 210 and to ENTER OPERATION 401E in FIG. 401E. From ENTER OPERATION 401E flow moves to IS FRAME POINTER BELOW TOP OF STACK? OPERATION 402A. At IS FRAME POINTER BELOW TOP OF STACK? OPERATION 402A the frame pointer 146, 156, 166, or 176 of a critical call initiating function 143, 153, 163 or 173 making the call to the critical OS function is examined to determine if the frame pointer 146, 156, 166, or 176 of a critical call initiating function 143, 153, 163 or 173 making the call to the critical OS function has a logical relationship to top of stack position 181, i.e., a check is made to ensure that the return address value 145, 155, 165 or 175 pointed to by the frame pointer 146, 156, 166, or 176 of a critical call initiating function 143, 153, 163 or 173 represents a position in stack 140 below top of stack position 181.

If at IS FRAME POINTER BELOW TOP OF STACK? OPERATION 402A it is determined that the return address value 145, 155, 165 or 175 pointed to by the frame pointer 146, 156, 166, or 176 of a critical call initiating function 143, 153, 163 or 173 represents a position above top of stack position 181, i.e., a "NO" result is found at IS FRAME POINTER BELOW TOP OF STACK? OPERATION 402A, the method of the invention further includes taking action to protect the computer system as flow moves through GO TO 216/218 IN FIG. 2 OPERATION 416D to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER BELOW TOP OF STACK? OPERATION 402A it is determined that the return address value 145, 155, 165 or 175 pointed to by the frame pointer 146, 156, 166, or 176 of a critical call initiating function 143, 153, 163 or 173 represents a position below top of stack position 181, i.e., a "YES" result is found at IS FRAME POINTER BELOW TOP OF STACK? OPERATION 402A, the result is considered indeterminate, because of the possibility of "false positive" results, and flow moves through to IS FRAME POINTER ABOVE BOTTOM OF STACK? OPERATION 402B.

At IS FRAME POINTER BELOW BOTTOM OF STACK? OPERATION 402B the frame pointer 146, 156, 166, or 176 of the critical call initiating function 143, 153, 163 or 173 making the call to the critical OS function is examined to determine if the frame pointer 146, 156, 166, or 176 of a critical call initiating function 143, 153, 163 or 173 making the call to the critical OS function has a logical relationship to bottom of stack position 141 and pointer 142, i.e., a check is made to ensure that the return address value 145, 155, 165 or 175 pointed to by the frame pointer 146, 156, 166, or 176 of a critical call initiating function 143, 153, 163 or 173 represents a position above bottom of stack position 141.

If at IS FRAME POINTER ABOVE BOTTOM OF STACK? OPERATION 402B it is determined that the return address value 145, 155, 165 or 175 pointed to by the frame pointer 146, 156, 166, or 176 of a critical call initiating function 143, 153, 163 or 173 represents a position below bottom of stack position 141, i.e., a "NO" result is found at IS FRAME POINTER ABOVE BOTTOM OF STACK? OPERATION 402B, the method of the invention further includes taking action to protect the computer system as flow moves through GO TO 216/218 IN FIG. 2 OPERATION 416B to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER ABOVE BOTTOM OF STACK? OPERATION 402B it is determined that the return address value 145, 155, 165 or 175 pointed to by the frame pointer 146, 156, 166, or 176 of the critical call initiating function 143, 153, 163 or 173 represents a position above bottom of stack position 141, i.e., a "YES" result is found at IS FRAME POINTER ABOVE BOTTOM OF STACK? OPERATION 402B, the result is considered indeterminate, because of the possibility of "false positive" results, and flow moves through to IS FRAME POINTER ABOVE FUNCTION PARAMETERS BLOCK? OPERATION 402C.

At IS FRAME POINTER ABOVE FUNCTION PARAMETERS BLOCK? OPERATION 402C, the frame pointer 146, 156, 166, or 176 of a critical call initiating function 143, 153, 163 or 173 making the call to the critical OS function is examined to determine if the frame pointer 146, 156, 166, or 176 of a critical call initiating function 143, 153, 163 or 173 making the call to the critical OS function has a logical relationship the function parameters block 147, 157, 167 or 177 associated with the critical call initiating function 143, 153, 163 or 173, i.e., a check is made to ensure that the return address value 145, 155, 165 or 175 pointed to by the frame pointer 146, 156, 166, or 176 of the associated critical call initiating function 143, 153, 163 or 173 represents a position above the function parameters block 147, 157, 167, or 177 associated with the critical call initiating function 143, 153, 163 or 173.

If at IS FRAME POINTER ABOVE FUNCTION PARAMETERS BLOCK? OPERATION 402C it is determined that the return address value 145, 155, 165 or 175 pointed to by the frame pointer 146, 156, 166, or 176 of a critical call initiating function 143, 153, 163 or 173 represents a position within or below the function parameters block 147, 157, 167, or 177 associated with the critical call initiating function 143, 153, 163 or 173, i.e., a "NO" result is found at IS FRAME POINTER ABOVE FUNCTION PARAMETERS BLOCK? OPERATION 402C, the method of the invention further includes taking action to protect the computer system as flow moves through GO TO 216/218 IN FIG. 2 OPERATION 416B to KNOWN FALSE POSITIVE? OPERATION 216 (or directly to TAKE PROTECTIVE ACTION OPERATION 218, if KNOWN FALSE POSITIVE? OPERATION 216 is not performed).

On the other hand, if at IS FRAME POINTER ABOVE FUNCTION PARAMETERS BLOCK? OPERATION 402C it is determined that the return address value 145, 155, 165 or 175 pointed to by the frame pointer 146, 156, 166, or 176 of a critical call initiating function 143, 153, 163 or 173 represents a position above the function parameters block 147, 157, 167, or 177 associated with the critical call initiating function 143, 153, 163 or 173, i.e., a "YES" result is found at IS FRAME POINTER ABOVE FUNCTION PARAMETERS BLOCK? OPERATION 402C, the result is considered indeterminate, because of the possibility of "false positive" results, and flow moves through to LAST FUNCTION IN SERIES? OPERATION 450.

At LAST FUNCTION IN SERIES? OPERATION 450 a determination is made as to whether the present function 143, 153, 163 or 173 is the only function, or the last function, in a series of functions. If at LAST FUNCTION IN SERIES? OPERATION 450 it is determined that the critical call initiating function 143, 153, 163 or 173 is not the last, or only, member of the series, flow moves to RETRIEVE NEXT FUNCTION SECTION FROM STACK OPERATION 452.

At RETRIEVE NEXT FUNCTION SECTION FROM STACK OPERATION 452, the next function 143, 153, 163 or 173 up stack 140 from the present function 143, 153, 163 or 173 is targeted and the process described above is repeated for each function 143, 153, 163 or 173 in the chain of functions resulting in the call to a critical OS function until the entire relevant portion of stack 140 has been "walked".

On the other hand, if at LAST FUNCTION IN SERIES? OPERATION 450 it is determined that the critical call initiating function 143, 153, 163 or 173 is the last, or only, member of the series, flow moves to GO TO 212 IN FIG. 2 OPERATION 412B in FIG. 4A to ALLOW CALL TO PROCEED OPERATION 212 in FIG. 2.

As discussed above, a method according to one embodiment of the invention makes use of positional relationships between the frame pointer, such as the Extended Base Pointer (EBP) in Windows®-based systems, the top of stack position, such as the Process Environment Block (PEB) in Windows® based systems, and the bottom of stack position, such as the Extended Stack pointer (ESP) in a Windows® based system.

In particular, in one embodiment of the invention, the frame pointer of a critical call initiating function is examined to determine if the frame pointer of the critical call initiating function has a logical relationship to the stack.

According to one embodiment of the present invention, a method includes checking to ensure that the frame pointer of a critical call initiating function has a logical relationship to the top of the stack position.

According to one embodiment of the present invention, a method includes checking to ensure that the frame pointer of a critical call initiating function has a logical relationship to the bottom of stack position.

According to one embodiment of the present invention, a method includes checking to ensure that the frame pointer of a critical call initiating function has a logical relationship to the function parameters block associated with the critical call initiating function.

According to one embodiment of the present invention, a method includes checking the frame pointer of a critical call initiating function using all three tests described above and if the frame pointer of a function making a call to a critical OS function fails any one of the three tests, the method further includes taking protective action to protect the computer system.

According to one embodiment of the present invention, a method includes repeating any, or all, of the three tests described above for each function in the chain of functions resulting in a call to a critical OS function until the entire relevant portion of the stack has been "walked".

Referring again to FIG. 1, in one embodiment of the invention, buffer overflow blocking application 106 is in computer memory 114. As used herein, a computer memory refers to a volatile memory, a non-volatile memory, or a combination of the two.

Although buffer overflow blocking application 106 is referred to as an application, this is illustrative only. Buffer overflow blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, buffer overflow blocking application 106 is implemented as a system level, e.g., kernel mode driver.

While embodiments in accordance with the present invention have been described for a client-server configuration, an embodiment of the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, buffer overflow blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the Return-to-LIBC attack blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the buffer overflow blocking functionality in accordance with one embodiment of present invention can be implemented in a wide variety of computer system configurations. In addition, the buffer overflow blocking functionality could be stored as different modules in memories of different devices. For example, buffer overflow blocking application 106 could initially be stored in server system 130, and then as necessary, a portion of buffer overflow blocking application 106 could be transferred to host computer system 102 and executed on host computer system 102. Consequently, part of the buffer overflow blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, buffer overflow blocking application 106 is stored in memory 136 of server system 130. Buffer overflow blocking application 106 is transferred over network 124 to memory 114 in host computer system 102. In this embodiment, network interface 138 and I/O interface 110 would include analog modems, digital modems, or a network interface card. If modems are used, network 124 includes a communications network, and buffer overflow blocking application 106 is downloaded via the communications network.

This disclosure provides exemplary embodiments of the present invention. The scope of the present invention is not limited by these exemplary embodiments. For example, for illustrative purposes, specific operations, and flow of operations, were described above and set forth in the FIG.s. However, those of skill in the art will readily recognize that the operations, and flow of operations, can be varied to meet the specific user's needs and to accommodate differing implementations of the invention.

As another example, those of skill in the art will recognize that the organizational relationships of the stack discussed above, can be varied from application to application, and operating system environment to operating system environment. In addition, the number of function sections of the stack can be more or less than the function sections discussed above. Consequently the number of function sections and the organizational relationships of the stack discussed above were chosen for illustrative purposes only and are not intended to limit the invention in any way.

Consequently, numerous variations, whether explicitly provided for by the specification or implied by the specification or not, may be implemented by one of skill in the art in view of this disclosure.

What is claimed is:

1. A computer program product comprising:
   a nontransitory computer readable storage medium having stored thereon processor executable instructions to perform a method comprising:
   stalling a call to a critical operating system (OS) function, said call to a critical operating system (OS) function being made by a critical call initiating function residing on a memory stack, wherein a critical operating system function is an operating system function necessary for a first application such as the critical call initiating function to cause execution of a second application; and
   determining whether a frame pointer of said critical call initiating function making said call to said critical operating system function has a logical positional relationship to said memory stack.

2. The computer program product of claim 1, the method further comprising:
   upon a determination that said frame pointer of said critical call initiating function making said call to said critical operating system function has a logical positional relationship to said memory stack, passing the call to the critical OS function to the operating system.

3. The computer program product of claim 1, the method further comprising:
   taking protective action to protect a computer system upon a determination that said frame pointer of said critical call initiating function making said call to said critical operating system function does not have a logical positional relationship to said memory stack.

4. The computer program product of claim 3 wherein said taking protective action comprises terminating said call to a critical operating system (OS) function.

5. A computer program product comprising:
   a nontransitory computer readable storage medium having stored thereon processor executable instructions to perform a method comprising:
   stalling a call to a critical operating system (OS) function, said call to a critical operating system (OS) function being made by a critical call initiating function residing on a memory stack, wherein a critical operating system function is an operating system function necessary for a first application such as the critical call initiating function to cause execution of a second application; and
   determining whether a frame pointer of said critical call initiating function making said call to said critical operating system function has a logical positional relationship to a top of stack position of said memory stack.

6. The computer program product of claim 5, the method further comprising:
   upon a determination that said frame pointer of said critical call initiating function making said call to said critical operating system function points to a value for a position in said memory stack that is below said top of stack position, passing the call to the critical OS function to the operating system.

7. The computer program product of claim 5, the method further comprising:
   taking protective action to protect a computer system upon a determination that said frame pointer of said critical call initiating function making said call to said critical operating system function points to a value for a position in said memory stack that is above said top of stack position.

8. The computer program product of claim 7, wherein said taking protective action comprises terminating said call to a critical operating system (OS) function.

9. A computer program product comprising:
a nontransitory computer readable storage medium having stored thereon processor executable instructions to perform a method comprising:
stalling a call to a critical operating system (OS) function, said call to a critical operating system (OS) function being made by a critical call initiating function residing on a memory stack, wherein a critical operating system function is an operating system function necessary for a first application such as the critical call initiating function to cause execution of a second application; and
determining whether a frame pointer of said critical call initiating function making said call to said critical operating system function has a logical positional relationship to a bottom of stack position of said memory stack.

10. The computer program product of claim 9, the method further comprising:
upon a determination that said frame pointer of said critical call initiating function making said call to said critical operating system function points to a value for a position in said memory stack that is above said bottom of stack position, passing the call to the critical OS function to the operating system.

11. The computer program product of claim 9, the method further comprising:
taking protective action to protect a computer system upon a determination that said frame pointer of said critical call initiating function making said call to said critical operating system function points to a value for a position in said memory stack that is below said bottom of stack position.

12. The computer program product of claim 11, wherein said taking protective action comprises terminating said call to a critical operating system (OS) function.

13. A computer program product comprising:
a nontransitory computer readable medium having stored thereon processor executable instructions to perform a method comprising:
stalling a call to a critical operating system (OS) function, said call to a critical operating system (OS) function being made by a critical call initiating function residing in a memory stack, said critical call initiating function comprising a function parameters block of one or more function parameter value positions, said function parameters block residing in said memory stack at a function parameters block position, wherein a critical operating system function is an operating system function necessary for a first application such as the critical call initiating function to cause execution of a second application; and
determining whether a frame pointer of said critical call initiating function making said call to said critical operating system function has a logical positional relationship to said function parameters block position.

14. The computer program product of claim 13, the method further comprising:
upon a determination that said frame pointer of said critical call initiating function making said call to said critical operating system function points to a value for a position in said memory stack that is above said function parameters block position, passing the call to the critical OS function to the operating system.

15. The computer program product of claim 13, the method further comprising:
taking protective action to protect a computer system upon a determination that said frame pointer of said critical call initiating function making said call to said critical operating system function points to a value for a position in said memory stack that is not above said function parameters block position.

16. The computer program product of claim 15, wherein said taking protective action comprises terminating said call to a critical operating system (OS) function.

17. A system comprising:
a processor; and
a memory coupled to the processor having processor executable instructions stored therein which when executed by the processor perform a process comprising:
stalling a call to a critical operating system (OS) function, said call to a critical operating system (OS) function being made by a critical call initiating function residing on a memory stack, wherein a critical operating system function is an operating system function necessary for a first application such as the critical call initiating function to cause execution of a second application; and
determining whether a frame pointer of said critical call initiating function making said call to said critical operating system function has a logical positional relationship to said memory stack.

18. The system of claim 17 further comprising:
upon a determination that said frame pointer of said critical call initiating function making said call to said critical operating system function has a logical positional relationship to said memory stack, passing the call to the critical OS function to the operating system.

19. The system of claim 17 further comprising taking protective action to protect a computer system upon a determination that said frame pointer of said critical call initiating function making said call to said critical operating system function does not have a logical positional relationship to said memory stack.

20. The method of claim 19, wherein said taking protective action comprises terminating said call to a critical operating system (OS) function.

* * * * *